(12) United States Patent  
Horie et al.

(10) Patent No.: US 11,645,200 B2  
(45) Date of Patent: May 9, 2023

(54) REDUCING LOAD BALANCING WORK STEALING

(71) Applicant: International Business Machines Corporation, Armonk, NY (US)

(72) Inventors: Michihiro Horie, Saitama (JP); Kazunori Ogata, Saitama (JP); Mikio Takeuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 17/102,696

(22) Filed: Nov. 24, 2020

(65) Prior Publication Data

US 2022/0164282 A1 May 26, 2022

(51) Int. Cl.
*G06F 12/02* (2006.01)

(52) U.S. Cl.
CPC .................... *G06F 12/0253* (2013.01)

(58) Field of Classification Search
CPC .................................................. G06F 12/0253
USPC ........................................................... 707/813
See application file for complete search history.

(56) References Cited

U.S. PATENT DOCUMENTS

| | | | | |
|---|---|---|---|---|
| 6,490,496 B1* | 12/2002 | Dacey | ............ | B29C 64/40 700/118 |
| 6,560,619 B1* | 5/2003 | Flood | ............ | G06F 12/0269 711/E12.012 |
| 6,823,351 B1* | 11/2004 | Flood | ............ | G06F 12/0276 711/E12.012 |
| 6,826,583 B1* | 11/2004 | Flood | ............ | G06F 12/0269 711/E12.012 |
| 7,103,887 B2* | 9/2006 | Shavit | ............ | G06F 9/4843 710/200 |
| 7,945,911 B1* | 5/2011 | Garthwaite | ............ | G06F 9/4843 707/814 |
| 8,539,493 B1* | 9/2013 | Robertson | ............ | G06F 9/4881 718/103 |
| 9,348,658 B1* | 5/2016 | Robison | ............ | G06F 9/522 |
| 10,055,259 B2* | 8/2018 | Lo | ............ | G06F 9/505 |
| 10,331,554 B2 | 6/2019 | Horie et al. | | |

(Continued)

FOREIGN PATENT DOCUMENTS

| | | | | |
|---|---|---|---|---|
| CN | 101917384 A | * | 12/2010 | ............ G06F 9/5027 |
| CN | 103699435 A | | 4/2014 | |

(Continued)

OTHER PUBLICATIONS

Hassanein, W., "Understanding and Improving JVM GC Work Stealing at the Data Center Scale", in Proceedings of the 2016 ACM SIGPLAN International Symposium on Memory Management, Jun. 2016, pp. 46-54. (Year: 2016).*

(Continued)

*Primary Examiner* — Phuong Thao Cao
(74) *Attorney, Agent, or Firm* — Donald J. O'Brien (57) ABSTRACT

Embodiments are disclosed for a method. The method includes determining that a thief thread attempted a work steal from a garbage collection (GC) owner queue. Additionally, the method includes determining that a number of tasks in the GC owner queue meets a predetermined threshold. Further, the method includes determining that the GC owner queue comprises a heavy-weight task. The method also includes moving the heavy-weight task to a top position of the GC owner queue.

20 Claims, 5 Drawing Sheets

(56) References Cited

U.S. PATENT DOCUMENTS

| | | | |
|---|---|---|---|
| 10,545,887 B2* | 1/2020 | Mirza | G06F 5/06 |
| 2003/0005025 A1* | 1/2003 | Shavit | G06F 9/4843 718/102 |
| 2003/0005029 A1 | 1/2003 | Shavit | |
| 2004/0088702 A1* | 5/2004 | Garthwaite | G06F 12/0276 711/E12.012 |
| 2006/0123423 A1* | 6/2006 | Brenner | G06F 9/5083 718/105 |
| 2008/0271042 A1* | 10/2008 | Musuvathi | G06F 11/3688 718/108 |
| 2010/0333091 A1* | 12/2010 | Lin | G06F 8/314 718/100 |
| 2011/0035751 A1* | 2/2011 | Krishnakumar | G06F 9/4881 718/103 |
| 2012/0102501 A1* | 4/2012 | Waddington | G06F 9/5061 718/105 |
| 2014/0181831 A1 | 6/2014 | Le Scouarnec | |
| 2014/0282595 A1* | 9/2014 | Lev | G06F 9/505 718/105 |
| 2017/0083364 A1* | 3/2017 | Zhao | G06F 9/5083 |
| 2017/0083382 A1 | 3/2017 | Lebeane | |
| 2017/0177414 A1* | 6/2017 | Newbern | G06F 9/546 |
| 2018/0314633 A1* | 11/2018 | Horie | G06F 9/4843 |
| 2018/0357291 A1* | 12/2018 | Choi | G06F 16/25 |
| 2020/0050484 A1 | 2/2020 | Horie et al. | |
| 2020/0110676 A1* | 4/2020 | Volos | G06F 11/203 |
| 2020/0151003 A1 | 5/2020 | Horie et al. | |
| 2020/0356473 A1* | 11/2020 | Horie | G06F 12/0269 |

FOREIGN PATENT DOCUMENTS

| | | | |
|---|---|---|---|
| CN | 110908794 A | 3/2020 | |
| CN | 111209311 A * | 5/2020 | G06Q 40/025 |
| EP | 1031392 A2 * | 8/2000 | B29C 64/112 |

OTHER PUBLICATIONS

Horie et al., "Scaling Up Parallel GC Work-Stealing in Many-core Environments", in Proceedings of the 2019 ACM SIGPLAN International Symposium on Memory Management, Jun. 2019, pp. 27-40. (Year: 2019).*

Arora et al., "Thread Scheduling for Multiprogrammed Multiprocessors". Proceedings of the Tenth Annual ACM Symposium on Parallel Algorithms and Architectures (SPAA), Jun. 1998, 11 pages.

Horie et al., "Garbage Collection Work Stealing Mechanism", U.S. Appl. No. 16/793,722, filed Feb. 18, 2020.

Van Dijk et al., "Lace: non-blocking split deque for work-stealing", Aug. 26, 2014, 13 pages.

Qian et al., "Smartstealing: Analysis and Optimization of Work Stealing in Parallel Garbage Collection for Java VM", Sep. 11, 2015, 12 pages.

Horie et al., "Balanced Double Queues for GC Work-Stealing on Weak Memory Models", ISMM'18, Jun. 18, 2018, 11 pages.

"Patent Cooperation Treaty PCT Notification of Transmittal of the International Search Report and the Written Opinion of the International Searching Authority, or the Declaration", Applicant's file reference EIE210846PCT, International Application No. PCT/CN2021/129290, International filing date Nov. 8, 2021, 9 pgs.

Wang et al., "Optimizing Load Balancing and Data-Locality with Data-aware Scheduling", Illinois Institute of Technology, Horntonwork Inc., Los Alamos National Laboratory, Downloaded Jan. 31, 2022, 10 pgs.

* cited by examiner

REDUCING LOAD BALANCING WORK STEALING

BACKGROUND

The present disclosure relates to load balancing work stealing, and more specifically, to reducing load balancing work stealing.

Load balancing refers to ways that computer systems divide up related work between multiple processes. In this way, load balancing can be useful for making computer systems operate more efficiently than these systems operate without load balancing.

SUMMARY

Embodiments are disclosed for a method. The method includes determining that a thief thread attempted a work steal from a garbage collection (GC) owner queue. Additionally, the method includes determining that a number of tasks in the GC owner queue meets a predetermined threshold. Further, the method includes determining that the GC owner queue comprises a heavy-weight task. The method also includes moving the heavy-weight task to a top position of the GC owner queue.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, load balancing can be a useful way to make computer systems operate more efficiently. For example, load balancing is useful for work stealing, which is a garbage collection technique. Garbage collection refers to removing outdated, and/or otherwise unused data from computer memory. Without garbage collection, computer storage can become cluttered, and/or introduce inefficiencies in the way computer applications run, and the way the memory itself operates. Garbage collection can involve multiple threads running in parallel to reduce the cluttering and other potential inefficiencies by effectively deleting unused data, for example, in computer memory.

The garbage collection (GC) threads can keep track of their own work, using a queue of tasks that the garbage collection thread builds as it explores the memory. However, when a garbage collection thread runs out of tasks, that garbage collection thread, e.g., the thief thread can "steal work" from an owner garbage collection thread that has outstanding tasks in its respective queue. In other words, when a garbage collection thread runs out of tasks, this thief thread steals a task from an owner thread's queue. In this way, the GC system balances the load of garbage collection amongst the garbage collection threads. However, there is a computational cost with respect to maintaining the integrity of the memory when performing work stealing in this way.

Accordingly, embodiments of the present disclosure can build garbage collection queues in a way that decreases the frequency with which thief threads steal tasks from other garbage collection threads. In some embodiments, garbage collection threads can position heavy-weight tasks in their queues for thief threads to steal. Heavy-weight tasks can be garbage collection tasks that are relatively more computationally expensive to perform than comparatively light-weight tasks. Accordingly, thief threads can spend more time completing stolen heavy-weight tasks than the time involved in completing lighter tasks, thus delaying the time between steals. In this way, embodiments of the present disclosure can reduce the frequency of steal attempts and improve the efficiency of load balancing work stealing.

Figure 1:
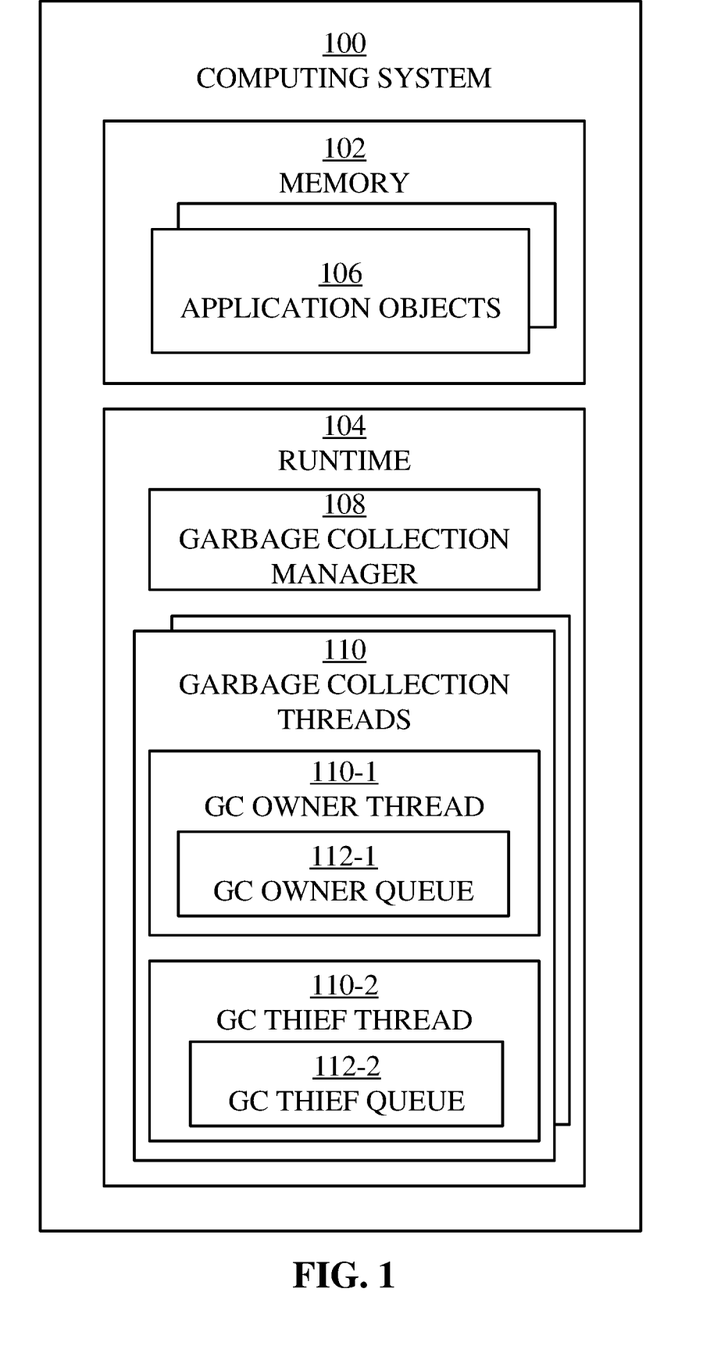
FIG. 1 is a block diagram of an example computing system for reducing load balancing work stealing, in accordance with some embodiments of the present disclosure.

FIG. 1 is a block diagram of an example computing system 100 for reducing load balancing work stealing, in accordance with some embodiments of the present disclosure. The computing system 100 includes a memory 102 and a runtime environment (runtime) 104. The memory 102 can be a computer memory that stores data and the computer instructions of computer applications. The memory 102 can include application objects 106, which can represent the data and computer instructions of computer applications that are currently running or have completed running on the computer system 100. In some scenarios, the application objects 106 can be represented as tree graphs, which are described in greater detail with respect to FIG. 2.

Referring back to FIG. 1, the runtime 104 can be a computing environment in which the computer applications execute. Further, the runtime 104 can manage the memory 102, how the applications access variables, provide mechanisms for passing parameters between applications, and interface with an operating system (not shown). Runtimes 104 can include virtual machines in enterprise and/or open source platforms, such as a Java Virtual Machine® (JVM).

According to some embodiments of the present disclosure, the runtime 104 can include a garbage collection manager 108 and garbage collection threads 110. The runtime 104 can use the garbage collection manager 108 and garbage collection threads 110 to manage the memory 102 by cleaning up leftover application objects 106 in the memory. In this way, the runtime 104 can help keep the memory 102 from becoming cluttered and impeding the performance of applications running on the computer system 100. In this way, the garbage collection manager 108 can use the garbage collection threads 110 to "collect the garbage" in the memory 102. Further, the garbage collection threads 110 can load balance the work of garbage collection by performing work stealing.

During garbage collection processing, the garbage collection threads 110 can include a garbage collection (GC) owner thread 110-1 and a GC thief thread 110-2. As stated previously, when one of the garbage collection threads 110 completes the tasks in its queue 112, this thread can "steal" a task from the GC owner queue 112-1 of another thread, e.g., the GC owner thread 110-1, and perform the stolen task to help balance the load of the garbage collection. The garbage collection thread 110 that steals the task is thus referred to as the GC thief thread 110-2.

As stated previously, work stealing can be computationally expensive and decrease the efficiency of the computer system 100. Accordingly, in some embodiments of the present disclosure, the garbage collection manager 108 can reduce the frequency of work stealing, and its associated costs, by providing stolen work, e.g., tasks, that takes the GC thief thread 110-2 a relatively longer time to perform than other tasks. For example, when the GC thief thread 110-2 attempts to steal a task from the GC owner thread 110-1, the garbage collection manager 108 can put a heavyweight task at the top of the queue for the GC thief thread 110-2 to steal. Accordingly, the GC thief thread 110-2 can spend more time performing a heavy-weight task than a comparatively lighter weight task. Thus, if the GC thief thread 110-2 completes the stolen task, there is a longer delay before the GC thief thread 110-2 steals another task from the GC owner thread 110-1. In this way, the garbage collection manager 108 can reduce the number of load balancing work steals that the GC thief thread 110-2 performs. Thus, the garbage collection manager 108 can improve the performance of load balancing work stealing in embodiments of the present disclosure.

Figure 2A:
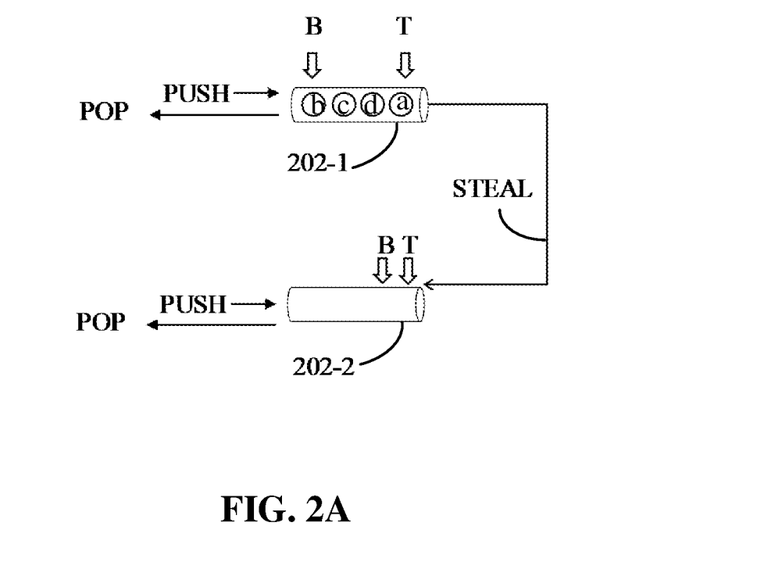
FIGS. 2A-2B are block diagrams of example GC owner queue and GC thief queue, in accordance with some embodiments of the present disclosure.

FIG. 2A is a block diagram of an example GC owner queue 202-1 and GC thief queue 202-2, in accordance with some embodiments of the present disclosure. The GC owner queue 202-1 and GC thief queue 202-2 are also referred to collectively as GC queues 202. The queues 202 are represented as cylinders containing circles, labeled alphabetically, each representing a task for a respectively named application object. These application objects can be examples of the application objects 106 described with respect to FIG. 1. Referring back to FIG. 2, the GC owner queue 202-1 includes tasks, "b," "c," "d," and "a" for respective application objects. Additionally, the queues 202 have arrows indicating the pointers for the bottom (B) and top (T) of the queue. Additionally, "push" and "pop" operations are represented with lines pointing respectively to and from task "b." Push operations add new entries to a queue. In contrast, the pop operation removes an item from the queue. In this example, the queues 202 represent an example last in first out (LIFO) double-ended queue. Accordingly, the bottom task is the last task pushed on the queue 202. Accordingly, task "b" is at the bottom of the queue, and thus the next task to be read and removed from the GC owner queue 202-1. Further, task "b" is the next task that GC owner thread 110-1, performs. In contrast, task "a" is at the top of the queue.

In contrast to the GC owner queue 202-1, the GC thief queue 202-2 has no tasks. The respective B and T arrows are represented separately for clarity. However, the bottom and top of the GC thief queue 202-2 indicate the same empty entry. This example represents a time when the GC thief thread 110-2 can attempt to "steal" a task from the GC owner queue 202-1. This steal attempt is indicated by the line between the GC queues 202. In this example, contrast to the work steal involves a pop operation which takes place at the top of the GC owner queue 202. In accordance with some embodiments of the present disclosure, the garbage collection can place task "a" in response to the work steal attempt if additional criteria are met. For example, the garbage collection manager 108 moves task "a" to the top of the queue if the number entries in the GC owner queue 202-1 meets a predetermined threshold and that task "a" is a heavy-weight task.

Figure 2B:
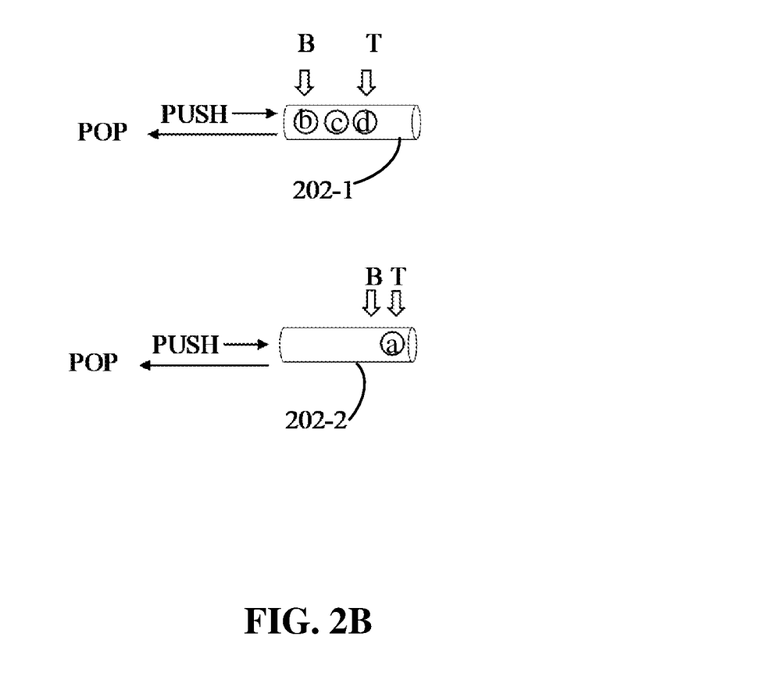

FIG. 2B is a block diagram of the example GC queues 202, in accordance with some embodiments of the present disclosure. In this example, the GC thief thread 110-2 has completed the work steal. Accordingly, task "a" is removed from GC owner queue 202-1, and copied to GC thief queue 202-2. Further, while the bottom of the GC owner queue 202-1 is still at task "B," the top of GC owner queue 202-1 is now at task "d." With respect to the GC thief queue 202-2, the bottom and top arrows are placed separately for clarity, but represent pointers to the same entry. Accordingly, task "a" is at the top and bottom of the GC thief queue 202-2.

Figure 3:
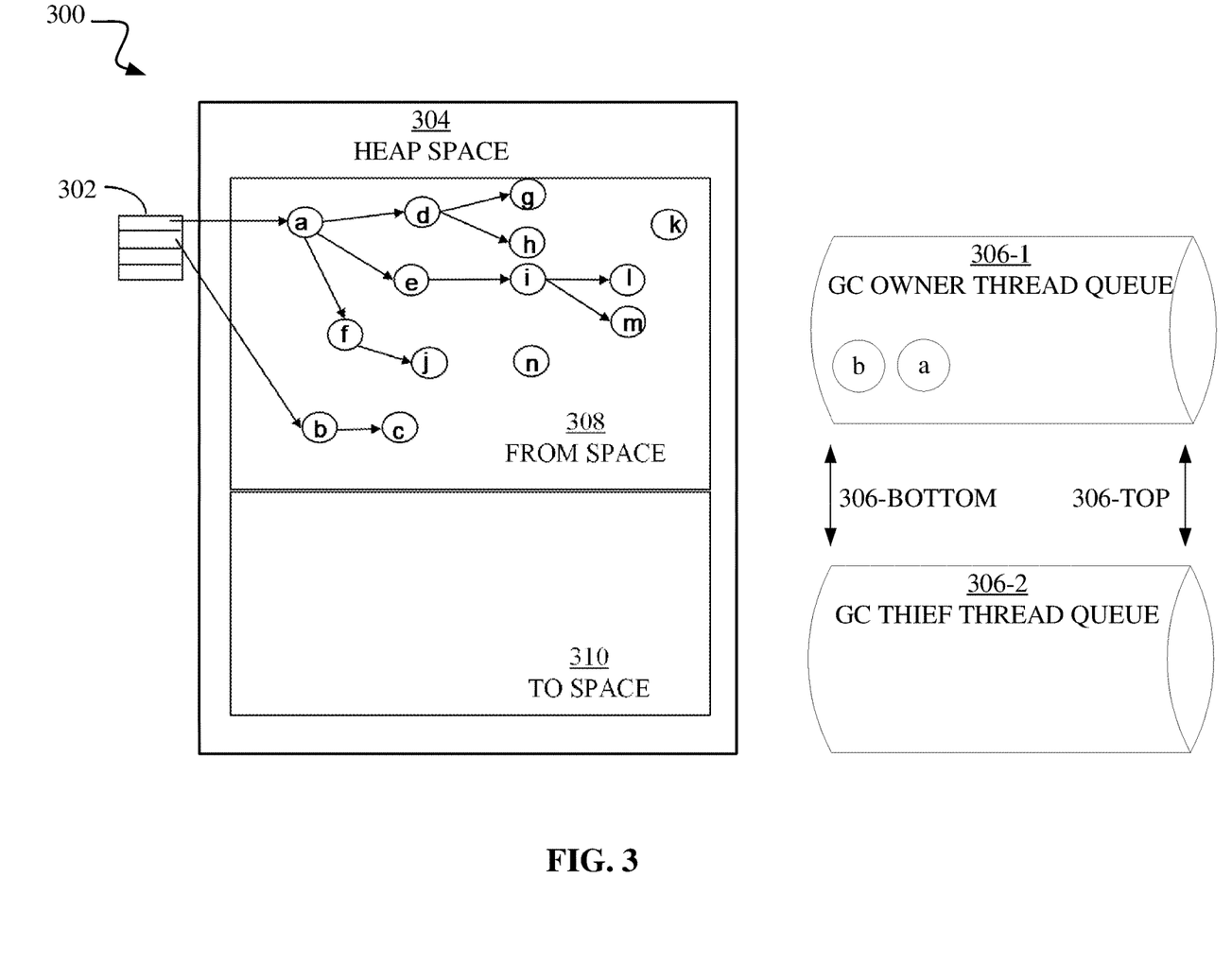
FIG. 3 is an example memory for reducing load balancing work stealing, in accordance with some embodiments of the present disclosure.

The FIG. 3 is a block diagram of an example memory 300 for reducing load balancing work stealing, in accordance with some embodiments of the present disclosure. As stated previously, the garbage collection threads 110, described with respect to FIG. 1, perform garbage collection tasks. In some cases, garbage collection tasks can involve parallel copying garbage collection (parallel copying GC). Parallel copying GC is used both in enterprise and open source JVMS, for example. Parallel copying GC can involve copying live application objects into a new space in memory. Live application objects can be application objects 106 that are still in use by computer applications. In contrast, inactive application objects are not copied into the new memory space. Inactive application objects can be application objects 106 that are no longer in use by computer applications. Because inactive application objects are not copied into the new memory space during parallel copying GC, these inactive application objects are effectively deleted from the memory 102.

Referring back to FIG. 3, the memory 300 can include a memory stack 302, heap space 304, GC owner thread queue 306-1, and GC thief thread queue 306-2. The memory stack 302 can be a directory maintained by a runtime, such as the runtime 104, with pointers to active application objects. In this example, the application objects 106 are labeled alphabetically, "a" through "n." The arrows from the stack 302 indicate pointers to application objects a and b. Application objects 106 can be represented using tree structures. The tree structure can indicate relationships between individual application objects. For example, application object, a, is related to application objects d, e, and f. The lines from application object a to application objects d, e, and f, can indicate that application object a includes pointers to application objects d, e, and f. These relationships can indicate an execution call from one application object 106 to another, the use of data stored in one application object by computer instructions of another application object, and the like.

The heap space 304 can be an area of the memory 300 where the runtime 104 can maintain the application objects 106 of computer applications. The GC owner thread queue 306-1 and GC thief thread queue 306-2 can be similar to the GC owner queue 112-1 of GC owner thread 110-1 and GC thief queue 112-2 of GC thief thread 110-2, described with respect to FIG. 1. Referring back to FIG. 3, the 306-top and 306-bottom can represent the respective top and bottom indices of the GC owner and thief queues. Additionally, the heap space 304 can include a from space 308 and to space 310. The from space 308 can be the current memory space that the runtime 104 is using for application objects 106. The to space 310 can represent the new memory space to which the garbage collection threads 110 are copying the live application objects.

As shown, there are no pointers from the stack 302, nor from any other application objects, to application objects k and n. The lack of pointers can indicate that these application objects are inactive application objects. Accordingly, the garbage collection threads 110 may not copy application objects k and n to the to space 310, effectively deleting these objects.

More specifically, in parallel copying GC, the runtime 104 can suspend computer application threads during GC time, i.e., when the garbage collection threads 110 are executing. Further, the garbage collection threads 110 can copy application objects by: 1) acquiring a space in to space 310, 2) copying the application object to the acquire space in the to space 310, 3) setting a forwarding pointer in the header of the original application object in the from space 308 to point to the copied object in the to space 310, 4) sets a pointer in the copied object A' to point to another copied object B' whose original object is a referenced object by A, and removes a pointer in the copied object A' toward the original B, and 5) finding references to other application objects 106 by scanning the copied application object. Since an application object 106 can be referred to from several application objects 106, multiple garbage collection threads 110 can reach the same application object during the copying procedure. As such, the garbage collection threads 110 copy the application objects 106 atomically. Since only one garbage collection thread 110 can successfully copy an application object 106, a forwarding pointer is set atomically by using a compare and swap operation. The thread that fails the compare and swap operation can thus delete its copy of the application object 106.

Figure 4:
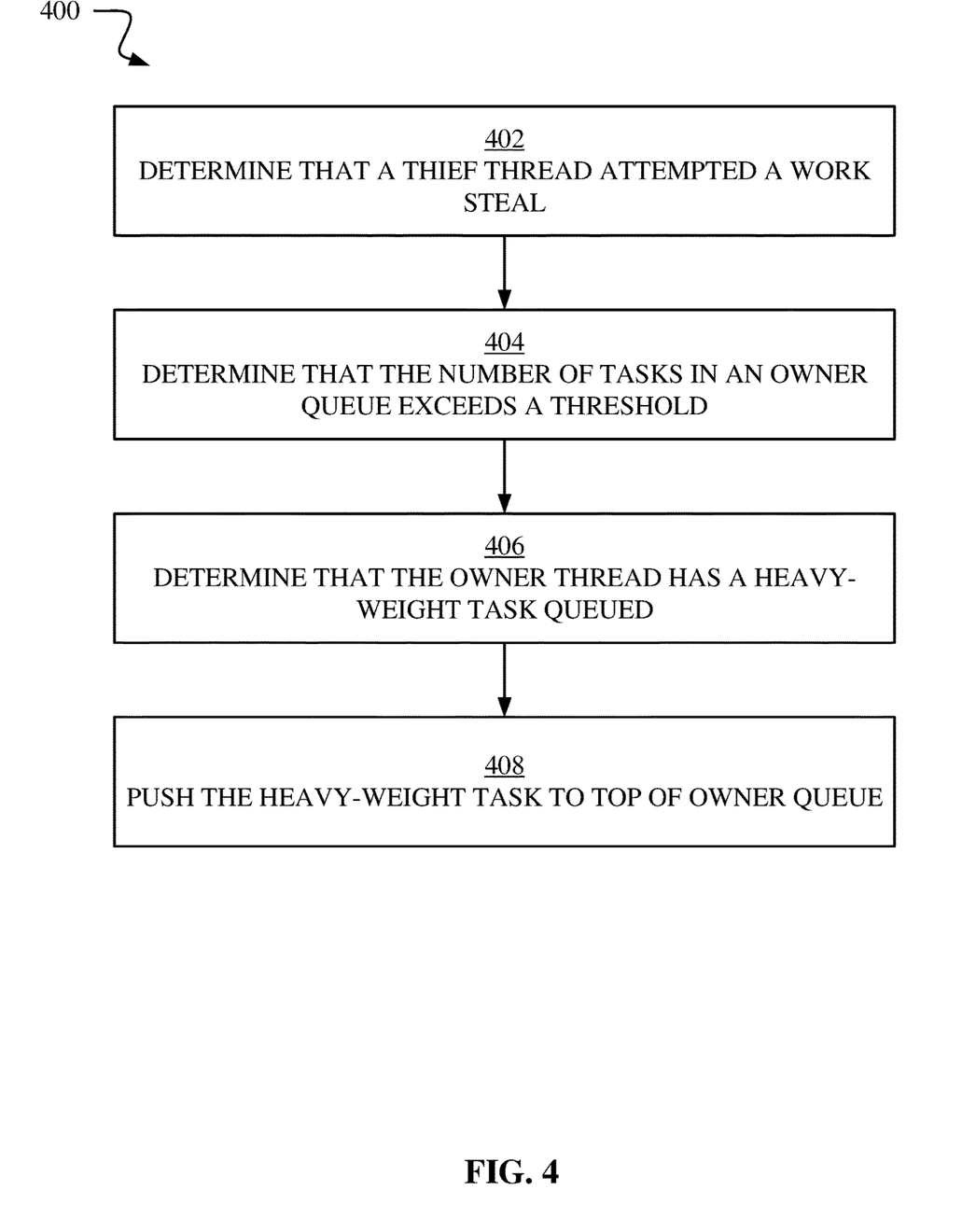
FIG. 4 is a process flow diagram of an example method for reducing load balancing work stealing, in accordance with some embodiments of the present disclosure.

FIG. 4 is a block diagram of an example process flow diagram of a method 400 for reducing load balancing work stealing, in accordance with some embodiments of the present disclosure. A garbage collection manager, such as the garbage collection manager 108, may perform the method 400.

At operation 402, the garbage collection manager 108 can determine that a thief thread, such as the GC thief thread 110-2, attempted a work steal. The garbage collection manager 108 can determine the attempt occurred based on whether the local index for the top of the GC thief queue 112-2 matches the global index. If there is not a match, the GC thief thread 110-2 attempted a work steal.

At operation 404, the garbage collection manager 108 can determine that the number of tasks in the owner queue meets or exceeds a predetermined threshold. It may not be useful to reduce work stealing if there are a relatively low number of tasks in the GC owner queue 112-1. As such, the predetermined threshold can indicate a least number of tasks such that reducing work steals improves efficiency.

At operation 406, the garbage collection manager 108 can determine that the GC owner queue 112-1 has a heavy-weight task queued. A heavy-weight task can be tasks for a heavy-weight application object, such as a reference array. In some embodiments of the present disclosure, an application object can represent a heavy-weight task if the application object includes more than a predetermined number of tasks.

At operation 408, the garbage collection manager 108 can push the heavy-weight task to the top of the GC owner queue 112-1. The garbage collection manager 108 can push the heavy-weight task to the top of the GC owner queue 112-1 by 1) decrementing the index to the top pointer locally, 2) storing an entry for the heavy-weight task at the decremented top, and 3) updating the top pointer globally using a compare and swap (CAS) instruction. The CAS instruction can determine if the heavy-weight task has already been copied to the, "to," space. If not, the garbage collection manager 108 can update the top pointer.

Figure 5:
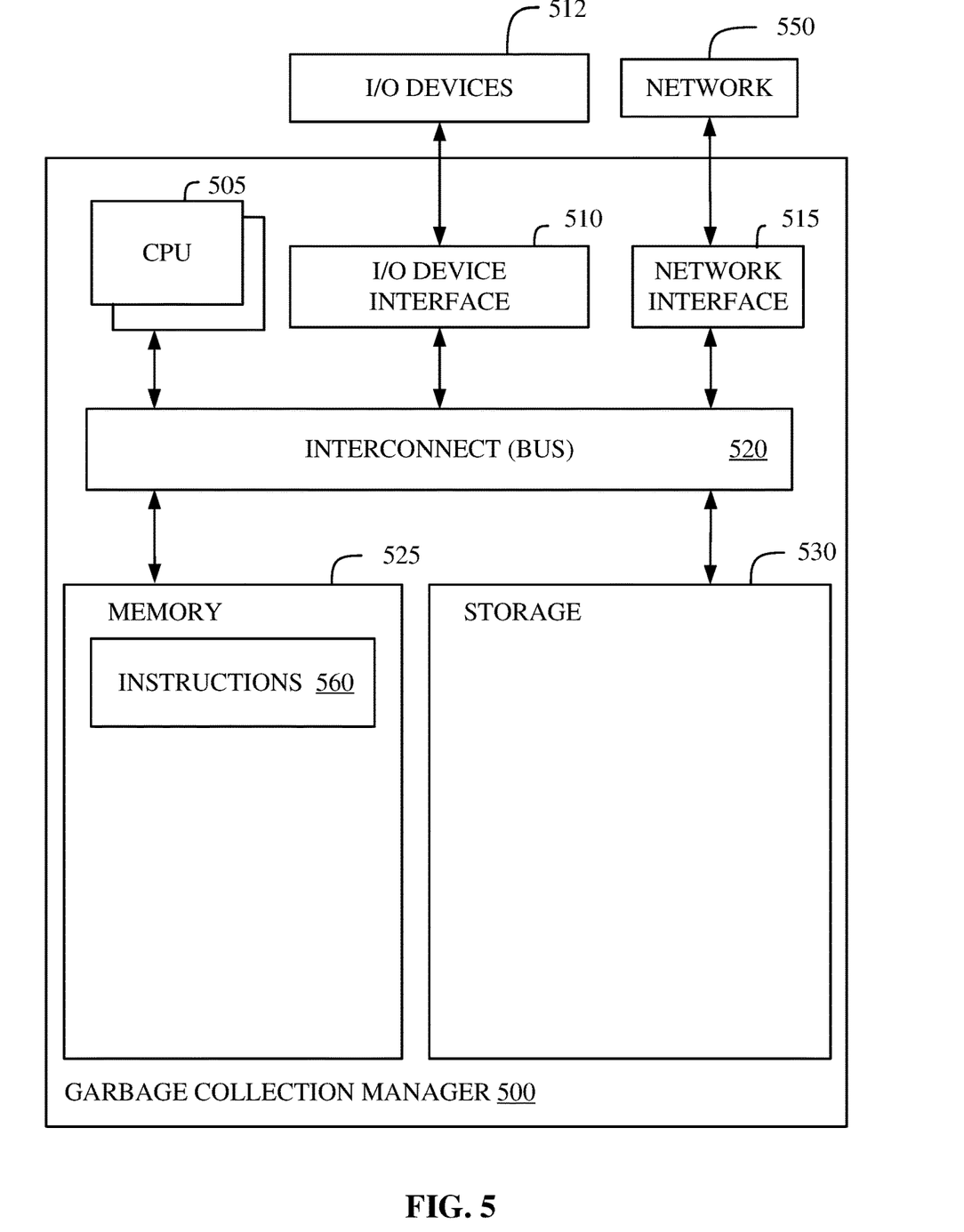
FIG. 5 is a block diagram of an example garbage collection manager, in accordance with some embodiments of the present disclosure.

FIG. 5 is a block diagram of an example garbage collection manager 500, in accordance with some embodiments of the present disclosure. In various embodiments, the garbage collection manager 500 is similar to the garbage collection manager 108 and can perform the method described in FIG. 4 and/or the functionality discussed in FIGS. 1-3. In some embodiments, the garbage collection manager 500 provides instructions for the aforementioned methods and/or functionalities to a client machine such that the client machine executes the method, or a portion of the method, based on the instructions provided by the garbage collection manager 500. In some embodiments, the garbage collection manager 500 comprises software executing on hardware incorporated into a plurality of devices.

The garbage collection manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the garbage collection manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the method described in FIG. 3 and/or the functionality discussed in FIGS. 1-2.

In various embodiments, the I/O devices 512 include an interface capable of presenting information and receiving input. For example, I/O devices 512 can present information to a listener interacting with garbage collection manager 500 and receive input from the listener.

The garbage collection manager 500 is connected to the network 550 via the network interface 515. Network 550 can comprise a physical, wireless, cellular, or different network.

In some embodiments, the garbage collection manager 500 can be a multi-user mainframe computer system, a single-user system, or a server computer or similar device that has little or no direct user interface but receives requests from other computer systems (clients). Further, in some embodiments, the garbage collection manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary garbage collection manager 500. In some embodiments, however, individual components can have greater or lesser complexity than as represented in FIG. 5, components other than or in addition to those shown in FIG. 5 can be present, and the number, type, and configuration of such components can vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    determining that a thief thread attempted a work steal from a top index of a garbage collection (GC) owner queue;
    determining that a number of tasks in the GC owner queue meets a predetermined threshold;
    determining that the GC owner queue comprises a heavy-weight task; and
    moving the heavy-weight task to a top position of the GC owner queue for the thief thread to steal.

2. The method of claim 1, wherein moving the heavy-weight task comprises:
    decrementing a local index to the top position of the GC owner queue; and
    storing the heavy-weight task at to the top position of the GC owner queue.

3. The method of claim 2, wherein moving the heavy-weight task further comprises:
    performing a compare and swap operation for moving the heavy-weight task to the top position of the GC owner queue.

4. The method of claim 1, wherein the heavy-weight task comprises a garbage collection task for an application object comprising a reference array.

5. The method of claim 1, wherein the heavy-weight task comprises a number of references to other application objects that exceeds a predetermined task reference threshold.

6. The method of claim 1, wherein the GC owner queue comprises a double-ended queue.

7. The method of claim 6, wherein the GC owner queue comprises a last-in-first-out queue.

8. A computer program product comprising one or more computer readable storage media, and program instructions collectively stored on the one or more computer readable storage media, the program instructions comprising instructions configured to cause one or more processors to perform a method comprising:
    determining that a thief thread attempted a work steal from a top index of a garbage collection (GC) owner queue;
    determining that a number of tasks in the GC owner queue meets a predetermined threshold;
    determining that the GC owner queue comprises a heavy-weight task; and
    moving the heavy-weight task to a top position of the GC owner queue for the thief thread to steal.

9. The computer program product of claim 8, wherein moving the heavy-weight task comprises:
    decrementing a local index to the top position of the GC owner queue; and
    storing the heavy-weight task at the top position of the GC owner queue.

10. The computer program product of claim 9, wherein moving the heavy-weight task further comprises:
    performing a compare and swap operation for moving the heavy-weight task to the top position of the GC owner queue.

11. The computer program product of claim 8, wherein the heavy-weight task comprises a garbage collection task for an application object comprising a reference array.

12. The computer program product of claim 8, wherein the heavy-weight task comprises a number of references to other application objects that exceeds a predetermined task reference threshold.

13. The computer program product of claim 8, wherein the GC owner queue comprises a double-ended queue.

14. The computer program product of claim 13, wherein the GC owner queue comprises a last-in-first-out queue.

15. A system comprising:
    one or more computer processing circuits; and
    one or more computer-readable storage media storing program instructions which, when executed by the one or more computer processing circuits, are configured to cause the one or more computer processing circuits to perform a method comprising:
    determining that a thief thread attempted a work steal from a top index of a garbage collection (GC) owner queue;
    determining that a number of tasks in the GC owner queue meets a predetermined threshold;
    determining that the GC owner queue comprises a heavy-weight task; and
    moving the heavy-weight task to a top position of the GC owner queue for the thief thread to steal.

16. The system of claim 15, wherein moving the heavy-weight task comprises:
    decrementing a local index to the top position of the GC owner queue; and
    storing the heavy-weight task at to the top position of the GC owner queue.

17. The system of claim 16, wherein moving the heavy-weight task further comprises:
    performing a compare and swap operation for moving the heavy-weight task to the top position of the GC owner queue.

18. The system of claim 15, wherein the heavy-weight task comprises a garbage collection task for an application object comprising a reference array.

19. The system of claim 15, wherein the heavy-weight task comprises a number of references to other application objects that exceeds a predetermined task reference threshold.

20. The system of claim 15, wherein the GC owner queue comprises a double-ended queue and a last-in-first-out queue.

* * * * *